United States Patent
Mielke et al.

(10) Patent No.: US 10,467,082 B2
(45) Date of Patent: Nov. 5, 2019

(54) DEVICE DRIVER VERIFICATION

(71) Applicant: MICROSOFT TECHNOLOGY LICENSING, LLC, Redmond, WA (US)

(72) Inventors: Markus W. Mielke, Redmond, WA (US); Jakob F. Lichtenberg, Redmond, WA (US); Vladimir A. Levin, Redmond, WA (US); Remy L. De Weduwe, Seattle, WA (US); Hyuk Joon Kwon, Redmond, WA (US); Nathan L. Deisinger, Redmond, WA (US); Vikas Pabreja, Sammamish, WA (US); Juncao Li, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 82 days.

(21) Appl. No.: 15/374,830

(22) Filed: Dec. 9, 2016

(65) Prior Publication Data
US 2018/0165141 A1 Jun. 14, 2018

(51) Int. Cl.
*G06F 11/00* (2006.01)
*G06F 11/07* (2006.01)

(52) U.S. Cl.
CPC .......... *G06F 11/079* (2013.01); *G06F 11/076* (2013.01); *G06F 11/0706* (2013.01)

(58) Field of Classification Search
CPC .............. G06F 9/4411; G06F 11/0751; G06F 11/3604; G06F 21/554; G06F 11/0766; G06F 11/3447; G06F 11/3452; G06F 11/079; G06F 11/0706; G05B 23/0205
See application file for complete search history.

(56) References Cited

U.S. PATENT DOCUMENTS

| | | | | |
|---|---|---|---|---|
| 5,754,887 | A | * | 5/1998 | Damron .............. G06F 11/0757 710/117 |
| 6,047,124 | A | | 4/2000 | Marsland |
| 6,243,833 | B1 | * | 6/2001 | Hitchcock ........... G06F 11/2215 714/33 |

(Continued)

OTHER PUBLICATIONS

Hockeyfan, "Driver Power State Failure BSoD—Stop 0x9F", Published on: Dec. 27, 2011 Available at: http://answers.microsoft.com/en-us/windows/forum/all/driver-power-state-failure-bsod-stop-0x9f/cbc8e0db-b227-4e93-8a31-95fc013cd15f?auth=1.

(Continued)

*Primary Examiner* — Loan L. T. Truong
(74) *Attorney, Agent, or Firm* — Newport IP, LLC; Han Gim

(57) ABSTRACT

Systems and methods are described for verifying functionality of a computing device. A set of rules are sent to a computing device identifying a device driver. Data is received from the one device that is indicative of collected driver data of the computing device. The data is collected by a driver verifier function executing on the computing device. The driver verifier function is configured to capture information associated with the identified device driver identified by the set of rules. The received data is parsed to categorize the data with previously collected driver data of other computing devices. The data is categorized based on attributes of the collected driver data. The categorized data is provided for analysis of the driver health on the computing device.

20 Claims, 8 Drawing Sheets

(56) References Cited

U.S. PATENT DOCUMENTS

| | | | | |
|---|---|---|---|---|
| 6,336,152 B1* | 1/2002 | Richman | ............... | G06F 9/4411 710/11 |
| 6,728,907 B1* | 4/2004 | Wang | ................... | G06F 11/073 714/2 |
| 7,111,307 B1* | 9/2006 | Wang | ................. | G06F 11/3668 711/152 |
| 7,146,542 B2 | 12/2006 | Srinivasan et al. | | |
| 7,162,394 B2* | 1/2007 | Cheng | ............... | G05B 23/0205 702/182 |
| 7,467,417 B2* | 12/2008 | Stillerman | ............ | G06F 21/572 713/187 |
| 7,640,070 B2* | 12/2009 | Chang | ............... | G05B 19/4184 700/110 |
| 7,861,121 B2 | 12/2010 | Wang | | |
| 7,966,522 B2 | 6/2011 | Fabbrocino | | |
| 8,055,945 B2 | 11/2011 | Compton et al. | | |
| 8,074,205 B2* | 12/2011 | Shastry | ................. | G06F 21/577 717/124 |
| 8,117,487 B1* | 2/2012 | Raut | .................... | G06F 11/004 709/224 |
| 8,141,052 B2* | 3/2012 | Guarraci | .............. | G06F 11/366 717/127 |
| 8,176,503 B2* | 5/2012 | Ford | .................... | G06F 9/4411 709/220 |
| 8,225,336 B2* | 7/2012 | Kim | ..................... | G06F 9/4411 719/324 |
| 8,666,723 B2 | 3/2014 | Xie et al. | | |
| 8,776,028 B1 | 7/2014 | Enakiev et al. | | |
| 8,819,701 B2 | 8/2014 | Wheeler et al. | | |
| 8,832,778 B2* | 9/2014 | McCune | ................ | G06F 21/85 726/1 |
| 9,003,363 B2 | 4/2015 | Lupu et al. | | |
| 9,235,464 B2 | 1/2016 | Neerincx et al. | | |
| 9,235,497 B2 | 1/2016 | Ma | | |
| 9,256,440 B1* | 2/2016 | Cattaneo | .............. | G06F 9/4411 |
| 9,274,770 B2 | 3/2016 | Song et al. | | |
| 9,459,910 B1* | 10/2016 | Merrill | .................... | G06F 9/545 |
| 9,519,495 B2* | 12/2016 | Levin | .................. | G06F 11/3612 |
| 9,710,340 B2* | 7/2017 | Scott | .................. | G06F 11/1469 |
| 2002/0059310 A1 | 5/2002 | Choi | | |
| 2004/0255210 A1* | 12/2004 | Peretz | ................. | G06F 11/1008 714/718 |
| 2005/0102567 A1 | 5/2005 | Mcguire et al. | | |
| 2005/0144436 A1* | 6/2005 | Chen | ..................... | G06F 11/273 713/100 |
| 2005/0198650 A1* | 9/2005 | Ford | .................... | G06F 9/4411 719/321 |
| 2006/0164909 A1* | 7/2006 | Gower | ................. | G11C 7/1048 365/193 |
| 2006/0209328 A1* | 9/2006 | Anderson | ............. | G06F 9/4411 358/1.13 |
| 2007/0209032 A1* | 9/2007 | Mihai | ............ | G01R 31/318371 717/126 |
| 2007/0288937 A1 | 12/2007 | Durojaiye et al. | | |
| 2008/0021667 A1 | 1/2008 | Aiwazian et al. | | |
| 2008/0184077 A1* | 7/2008 | Kuttan | ................ | G06F 11/0745 714/48 |
| 2008/0209448 A1* | 8/2008 | Ayres | ..................... | G06F 13/14 719/321 |
| 2008/0258865 A1* | 10/2008 | Shastry | .................. | G06F 21/51 340/5.21 |
| 2010/0186003 A1* | 7/2010 | Shapiro | ............... | G06F 11/3604 717/126 |
| 2010/0275186 A1* | 10/2010 | McGarvey | .......... | G06F 11/3604 717/132 |
| 2010/0333202 A1* | 12/2010 | Von Der Lippe | ..... | G06F 21/554 726/22 |
| 2011/0138476 A1 | 6/2011 | Black et al. | | |
| 2012/0084759 A1* | 4/2012 | Candea | ............... | G06F 11/3612 717/126 |
| 2012/0110344 A1 | 5/2012 | Sadovsky et al. | | |
| 2013/0227356 A1* | 8/2013 | Kim | .................... | G06F 11/1417 714/48 |
| 2013/0318397 A1 | 11/2013 | Jamison | | |
| 2014/0025983 A1* | 1/2014 | Usui | ................... | G06F 11/0793 714/2 |
| 2014/0372985 A1 | 12/2014 | Levin et al. | | |
| 2014/0372986 A1* | 12/2014 | Levin | .................. | G06F 9/44589 717/126 |
| 2015/0046512 A1 | 2/2015 | Ashby et al. | | |
| 2015/0067399 A1* | 3/2015 | Jaroker | ............... | G06F 11/2294 714/37 |
| 2015/0127124 A1* | 5/2015 | Kobayashi | ............. | B25J 9/1689 700/83 |
| 2015/0163121 A1 | 6/2015 | Mahaffey et al. | | |
| 2015/0281015 A1* | 10/2015 | Griffith | ............... | H04L 43/0817 709/224 |
| 2015/0281267 A1* | 10/2015 | Danahy | ............... | H04L 63/1416 726/23 |
| 2016/0098562 A1* | 4/2016 | Hawblitzel | ............... | G06F 8/41 726/22 |
| 2016/0132381 A1* | 5/2016 | Bello | .................. | G06F 11/0778 714/45 |
| 2016/0139978 A1* | 5/2016 | Grande | ............... | G06F 11/0778 714/45 |
| 2016/0294800 A1 | 10/2016 | Oppenheim et al. | | |
| 2017/0010936 A1* | 1/2017 | Daoud | .................. | H04W 40/20 |
| 2017/0034023 A1* | 2/2017 | Nickolov | ............ | H04L 43/0817 |
| 2017/0255535 A1* | 9/2017 | Freeman | ............. | G06F 11/0766 |
| 2018/0020021 A1* | 1/2018 | Gilmore | .............. | H04L 63/1458 |
| 2018/0112983 A1* | 4/2018 | Ahmed | ................ | G01C 21/005 |
| 2018/0165145 A1* | 6/2018 | Mielke | ................ | G06F 11/0772 |
| 2018/0189484 A1* | 7/2018 | Danahy | ................. | G06F 21/554 |

OTHER PUBLICATIONS

"Using Driver Verifier to identify issues with Windows drivers for advanced users", Retrieved on: Sep. 8, 2016 Available at: https://support.microsoft.com/en-in/kb/244617.

"Diagnosability—Driver Verifier—Disable Driver Verifier", Retrieved on: Sep. 8, 2016 Available at: https://msdn.microsoft.com/en-in/library/windows/hardware/dn260319%28v=vs.85%29.aspx.

"Non Final Office Action Issued in U.S. Appl. No. 15/374,780", dated Apr. 4, 2019, 9 Pages.

"Digi Remote Manager", Retrieved from: http://www.digi.com/products/cloud/digi-remote-manager, Retrieved on: Sep. 13, 2016, 8 Pages.

"Errors Dashboard", Retrieved from: https://docs.stackify.com/docs/errors-dashboard, Retrieved on: Sep. 13, 2016, 12 Pages.

"Stackdriver Error Reporting Beta", Retrieved from: https://cloud.google.com/error-reporting/, Retrieved on: Sep. 13, 2016, 2 Pages.

"Troubleshoot System, Hardware and Device Issues (Desktop Health)", Retrieved from: https://help.aternity.com/bundle/console_user_guide_9_0_server_local/page/console/topics/console_dsh_desktop_health.html, Retrieved on: Sep. 13, 2016, 17 Pages.

Ball, et al., "The Static Driver Verifier Research Platform", In Proceedings of the International Conference on Computer Aided Verification, Jul. 15, 2010, 4 Pages.

"International Search Report and Written Opinion Issued in PCT Application No. PCT/US2017/064393", dated Apr. 4, 2018, 13 Pages.

Spaven, Frejya, "Reduce Software Errors Using These 6 Tips", Retrieved from https://raygun.com/blog/2016/05/reduce-software-errors/, May 19, 2016, 13 Pages.

* cited by examiner

DEVICE DRIVER VERIFICATION

BACKGROUND

Computing devices today have an increasing number of attached and installed peripheral devices. In order to interface to such peripherals, the computing device typically runs a device driver to operate or control each type of device. As the variety and number of peripheral devices increase and the number of computing devices grow, tracking and verifying the proper operation of the device drivers is becoming increasingly difficult prior to production and release.

SUMMARY

Disclosed herein are methods and systems for facilitating operation of a plurality of computing devices. In an embodiment, a set of rules identifying associated with a device driver are sent to a computing device. Data is received from the computing device. The data is indicative of collected driver data of the computing device. The driver data is collected by a driver verifier function executing on the computing device, and the driver verifier function is configured to capture information associated with the identified device driver based on the set of rules. The received data is categorized with previously collected driver data of other computing devices. The data is categorized based at least in part on attributes of the collected driver data. The categorized data is provided for analysis of the driver health on the computing device.

It should be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

Figure 1:
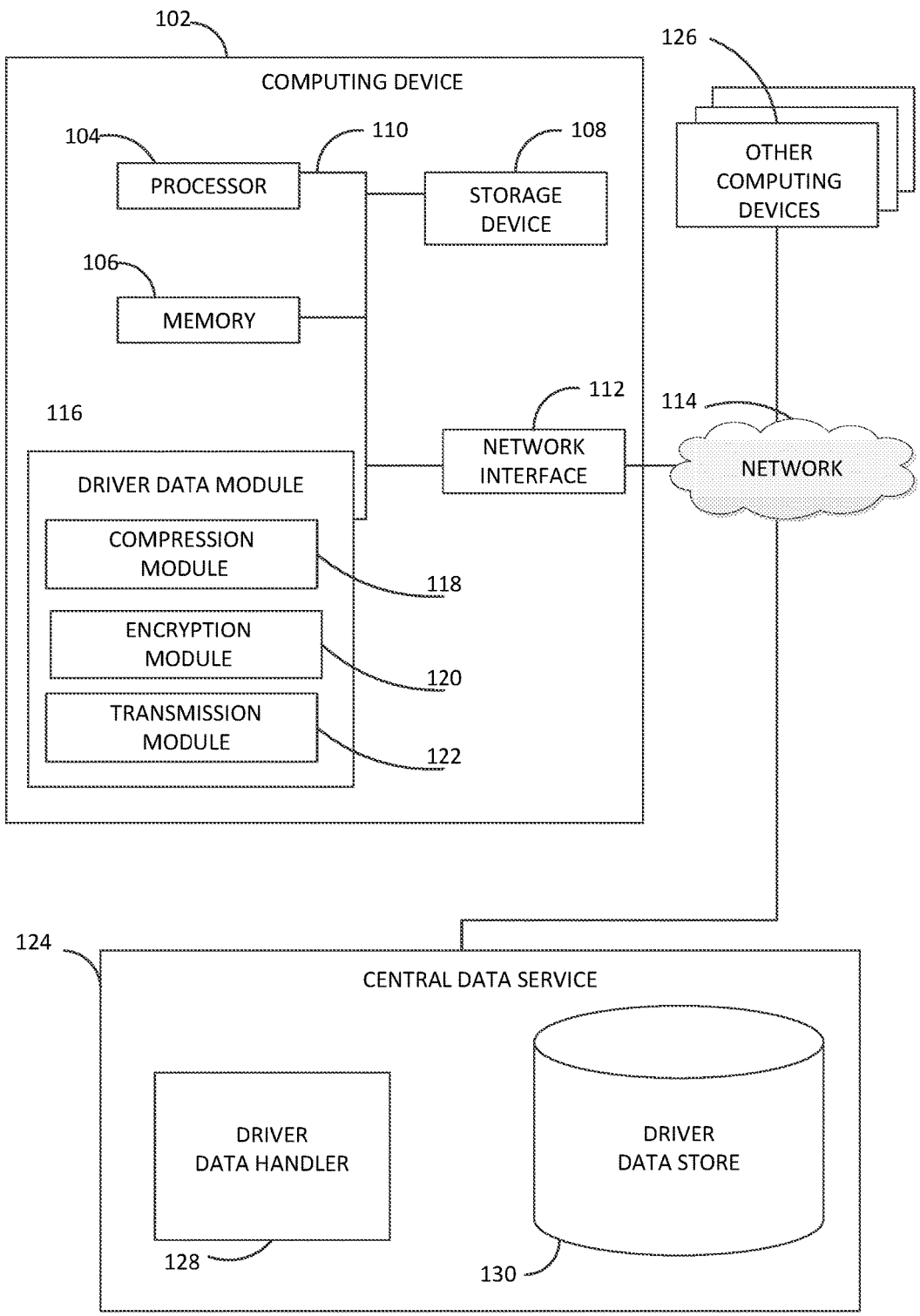
FIG. 1 is a diagram illustrating a mechanism for verification of drivers in accordance with the present disclosure.

A platform or software provider may have an installed base of many thousands of computing devices including mobile devices and other devices such as servers. Numerous computing settings can be adjusted on these devices. For example, hardware settings and network settings may be configured differently across the user base. Because of the sheer number and variety of device configurations, it can be difficult to test and verify all of the components and software, let alone characterize the performance of the computing devices with respect to specific metrics. When a device driver encounters a service issue, troubleshooting the issue can be a complex process due to the amount of data that must be evaluated. Even when the cause of a problem is found, the loss of use of the computing device may result in lost data, down time, and customer dissatisfaction.

Development and verification of device drivers is itself a complex task. Proper testing of device drivers is important to ensuring a high-quality installation and user experience with a particular driver. Devising tests that encompass all situations that a driver might experience is difficult and may not be possible prior to release of the product. For example, device testing while a driver is still in production can give rise to errors that are not covered by testing environments. Validating the driver to work in a live system with all the interactions with other drivers makes the problem more complex. When the driver is released and allowed to execute in a production environment, the driver may handle critical tasks and receive continuous requests from other components. Any failures that occur during production operations may therefore have a direct impact on device functionality and end user perception of the quality of the system.

The following detailed description is directed to technologies for the assessment of device drivers. In the examples described herein, providing driver assessment and support services is one example scenario in which the described embodiments can be implemented. However, the described concepts can apply generally to other computing components and services.

Various embodiments are described for collecting and analyzing information for device drivers via driver data collection. The described methods can include enumerating, via a driver data module, data pertaining to a device driver. The described methods may also include generating a data object in the computing device executing the driver.

The driver data collection methods may be used to capture and send a detailed snapshot of the health and status of a device driver to a central repository. When this capability is combined with analytical methods such as machine learning, a service provider can be enabled with various ways to identify and compile root causes for driver issues. For example, support staff may be presented with summary data for driver issues. The summary data may also be cross-referenced against similar devices. Such a central repository may be also referred to herein as a driver verification analysis service or a centralized device driver data collection service, either of which may include a telemetry manager as further described herein. By providing such a driver verification analysis service with detailed and in-service data, services can be provided for any type and combination of device drivers.

Additionally, by providing such a driver verification analysis service with device driver data, the levels of analysis and services that may be provided by the service provider may be enhanced. For example, analysis and assessment of information based on large amounts of information may be automated, allowing for greater levels of evidence-based analysis and services for device drivers.

By using the described techniques, in some cases driver errors can be identified and corrected before the errors can significantly impact the end user experience. The local device driver information may be collected during in-service operations to diagnose driver errors that were not identified in pre-release testing environments. In some embodiments, a driver verifier function may be configured to execute in a data capture or logging mode on the local computing device that is executing the driver. The local computing device may communicate with a telemetry manager and receives scenarios to configure the device verifier function. The device verifier function may be configured to target specific classes of drivers (e.g., audio, NDIS, camera) with specific checks and data capture instructions. When specified conditions are met, such as detecting a violation of a rule received from the telemetry manager, an event may be logged and collected. The local device is not allowed to crash (e.g., blue screen), as is typical in response to a driver failure. After a specified time, the device verifier can be automatically disabled or deleted to avoid performance impact on the device. By allowing such data capture during production and in-service, some device driver failures can be detected early during development and fixes can be incorporated before the driver is more widely released in production.

To allow for analysis and assessment of the errors that are captured during runtime, a mechanism for viewing the most important errors can be provided. To facilitate identification of driver errors that are occurring during production, a mechanism for prioritizing and analyzing the driver errors is described herein. In one embodiment, a telemetry manager is provided to allow for the construction of scenarios to configure a device verifier. Scenarios for verifying specific drivers may be constructed and sent to various user devices. The scenarios can include a set of rules to target identified device drivers and on target user devices. In some embodiments, a hierarchy of rules can be created to establish a baseline for how a driver in the same device class should behave. The scenarios may be deployed to production user devices. A rule can be implemented as any declarative statement using a specified format or declarative language. The rule declares a statement that can be used to configure the driver verifier function.

In an embodiment, driver data may be collected from the user devices and organized into data buckets that can be queried and analyzed. The telemetry manager may be configured to harvest collected data on a periodic basis and for each driver/driver version pair. The telemetry manager may be configured to keep track of driver performance and rule violations. In some embodiments, a device driver's performance may be compared with other drivers in the same device class and previous versions. The telemetry manager may also be configured to convert the analysis into scores to provide rule rankings. A driver health dashboard may be provided to organize the data from user devices to allow insights into the quality of a specified driver. The dashboard can allow for analysis of metrics to determine whether to promote a driver to a higher verification level.

For example, in one example scenario, a driver may be observed to record rule violations 25% of the time, while the established baseline for a driver in the same class is only observed with violations 10% of the time. One of the rule violations may be found to have occurred in 30% of computing devices, where the established baseline only experiences that same rule violation 5% of the time. Other rule violations may have found to have occurred in less cases than the established baseline for the driver type. Accordingly, it can be determined that the first violation should be evaluated to attempt to improve performance in order to be consistent with other drivers in its class.

In one embodiment, the centralized device driver data collection service may collect a list of unique driver violations with information about the associated driver such as the driver version and device identifier for which the violation occurred. The list of unique driver violations may be used to determine the number of unique violations for a given driver and version of the driver. In one embodiment, a list all the driver versions and driver name pairs and the violation frequency for each may be generated. Additionally, for a given driver and driver version, the number of computing devices that have downloaded the driver may be determined.

Information pertaining to drivers on computing devices can be collected and acted upon without significant interruptions or locking/shutdown of the computing device. In one embodiment, driver data collection and verification can take place in a logging mode on the computing device to expand verification coverage. Scenarios and rules can be developed, for example, using the telemetry manager and sent to the computing device. The computing device may execute a local device driver verifier function, which may be implemented as a local agent executing on the computing device.

The device driver verifier function may be configured to target specific classes of drivers (e.g., audio, NDIS, camera) with specified checks, based on the received rules. Upon detection of a rule violation, the violation event may be logged by the device driver verifier function and provided to a telemetry component for sending to the centralized device driver data collection service. After a predetermined time, or a specified time, or upon command or other means, the device driver verifier function may be automatically disabled to avoid any future performance impacts. The telemetry data collected by the centralized device driver data collection service may be used to detect drivers in use that are violating device verification rules and take responsive action as needed.

The techniques described herein may be implemented on any type of user device that executes drivers, such as laptops and mobile devices. In order to minimize performance and recoverability impacts, in some embodiments certain classes of drivers may be selected and targeted for verification checks specific to that platform. In one embodiment, only one class of drivers may be selected at a time.

To further avoid user interruptions, the device driver verifier function may be configured to avoid a bug check (fatal system error) if a rule is violated. Instead, the computing device may continue to operate and the device driver verifier function may continue to log rule violations without a bug check. Additionally, bug checks may be disabled for failures which are not covered by any verification rules. In some embodiments, the device driver verifier function may be reset upon a failed boot, and the device driver verifier function may also be automatically disabled after a predetermined period of time or a predetermined number of boots.

In an example embodiment, a set of scenarios that cover various selected driver checks to run on target user devices can be generated. The scenarios may be deployed to a set of user device pools that are defined by the telemetry manager. The user devices that have received the scenarios may use the scenarios in the device driver verifier function and begin to collect data for the specified drivers. The user devices may begin to send back telemetry on any driver errors encountered. When received by the centralized device driver data collection service, the data can be analyzed. The centralized device driver data collection service may also adjust scenarios as needed to target specific drivers or user devices to gather additional data. The centralized device driver data collection service may also send the information to other services for further analysis and debugging.

In an embodiment, the described verification checks may include general checks and rule-based checks. General checks may include, for example, I/O verification, memory management checks, and other verification behavior which is not defined in terms of specific state machines. Rule-based checks may be defined ahead of time using a rule definition language. The rules may be structured to detect issues which arise when a driver enters an illegal state or other condition. For example, the rules may apply to calls for a driver application programming interface such as Device Driver Interface (DDI). Typically, checks may be activated or deactivated by setting flags in the operating system registry.

Under typical driver configurations, violation of a verification check may result in a bugcheck. For implementations that incorporate the device driver verifier function described herein, the device driver verifier function may exercise control over driver behavior when a rule is violated and prevent bug checks.

In some embodiments, the computing device may operate in a normal mode and a driver test mode, where the device driver verification manager operates only in a logging state. In this state, any driver violations will be logged rather than cause a bug check. Violations may be logged to an event log that can be accessed by a telemetry agent for sending to the centralized device driver data collection service.

In some embodiments, automatic checks may be configured to only activate when a specific flag separate from a bug check is set. Additionally, the device driver verifier function may be configured to enable only checks corresponding to active flags.

In some embodiments, information that is logged may include the rule violated and the module that the event was logged from. Additional information may be logged to enable further analysis and allow for diagnosis of errors. For example, information can be logged pertaining to the state of the rule that was violated at the point of failure. Additionally, a live dump may be collected. Collection of the additional data may be controlled at configuration time.

To minimize performance impact on the computing device, the centralized device driver data collection service may be configured so that there is only one set of rules enabled at a time on drivers which the rules can apply to. For example, the device driver verification manager may be configured to run NDIS rules on NDIS drivers, but not simultaneously run audio rules on audio drivers.

To reduce network congestion when telemetry is being sent, the device driver verifier function may send basic information about the violation. Additionally, the device driver verifier function may eventually stop generating events if the same issue is repeatedly occurring. This may occur when a faulty driver is being actively exercised. The device driver verifier function may be configured to send detailed information only when a specific flag is set.

For power-sensitive devices such as those operating on battery power, the device driver verifier function may be configured to operate in a power saving mode to operate so as to minimize transmission of error data during poor connectivity or to store the data for later transmission when the battery is low.

In some embodiments, custom groups of computing devices may be specified. For example, groups may be specified by gathering a list of user devices that may be selected to correlate data for systems that contain only a specific device and driver. In this way, devices for a particular type or manufacturer, or a specified driver version, may be targeted for focused analysis. In other examples, devices of a specified OS version, region, or other factors may be targeted.

The centralized device driver data collection service may collect telemetry data from all telemetry-enabled end user devices that are connected and are able to transmit the information, in accordance with the rules. The centralized device driver data collection service may organize the telemetry data into streams or buckets which can be queried against, analyzed, and further categorized. To analyze the data, queries can be used to search for unique event identifiers. For examples, event identifiers may include categories such as user devices that have encountered specified driver errors, the characteristics of the error, drivers that are violating checks, what checks have been violated, the frequency of the violations, and so on.

The data can be scheduled to be collected on a periodic or otherwise scheduled basis. The collected data may be analyzed to identify trends and thresholds. For example, if a particular driver has an unusually large amount of events associated with it, it can be determined that further analysis needs to be performed for this driver. In response, a scenario can be constructed to target the driver in question, with additional logging options enabled.

A user interface can be provided to present graphical dashboards that summarize the collected driver data. In some embodiments, the dashboard may include options to select a date-range, filter by platform, filter by driver class, filter by driver, filter by rule, and so on.

In some embodiments, information for a specific driver may be tracked as follows:

(# machines specific violation occurred/# machines in experiment)*100=driver violation frequency (# total machines with violations/# machines in experiment)*100=overall violation frequency In some embodiments, information for drivers in the same class may be tracked as follows:

(# machines specific violation occurred/# machines in experiment)*100=baseline frequency (# total machines with violations/# machines in experiment)*100=overall baseline frequency In some embodiments, information for a particular violation may be tracked as follows:
For each violation:

violation frequency*(violation weight)−baseline frequency=violation score

If: Σviolation scores>15→indication (e.g., red)
Else if: Σviolation scores<5→continue In some embodiments, information for regression (comparing new version with previous version) may be tracked as follows:
If: Σold violation scores−Σcurrent violation scores<−5→indication (e.g., red)
Elseif: Σold violation scores−Σcurrent violation scores>0→indication (e.g., green)

In some embodiments, the computing device may operate in a learning mode where driver issues are collected and a baseline profile is created, rather than generating a system error.

In some embodiments, the detailed device driver information may be supplemented with information from the service provider, information from industry sources, and crowdsourced information.

In one example, once a driver problem or issue is detected, the centralized device driver data collection service may be configured to collect data from deployed user devices, analyze the data, and present the analyzed data. Once a fix to the problem or issue is identified, the centralized device driver data collection service may automatically push fixes or automate roll back of driver updates.

In some embodiments, the centralized device driver data collection service may be implemented as an alternative or enhancement to human-based analysis that can allow for management of numerous variables and device states that may be difficult or impossible without such a system. Device and system providers may release new driver code through the centralized device driver data collection service. Testing and validation may thus be performed in a continuous manner, utilizing networks such as the Internet, and provided on an automated basis while reducing device driver issues and vulnerabilities.

Some of the techniques described herein include an executable module local to the computing device. The executable module may be referred to herein as a driver data module which may be part of the device driver verifier function. The driver data module may generate a data object in-memory. In some embodiments, the data object may be compressed and encrypted for transport across networks including non-secure network paths. For example, the compressed and encrypted data object may be durable such that transport across non-secure network paths may be used when other paths are not available with a reduced risk of exposing private or confidential data.

FIG. 1 is a block diagram of an example of a computing system configured to provide driver data of a computing system and environment. The system may include a computing device 102. The computing device 102 may be, for example, a mobile phone, laptop computer, desktop computer, or tablet computer, among others. The computing device 102 may include a processor 104 that is adapted to execute stored instructions, as well as a memory unit 106 that stores instructions that are executable by the processor 102. The memory unit 106 may be non-persistent memory in relation to a storage device 108 that may include a hard disk drive for example. The processor 104 can be a single core processor, a multi-core processor, a computing cluster, or any number of other configurations. The memory unit 106 can include random access memory (e.g., static random access memory (SRAM), dynamic random access memory (DRAM), zero capacitor RAM, Silicon-Oxide-Nitride-Oxide-Silicon SONOS, embedded DRAM, extended data out RAM, double data rate (DDR) RAM, resistive random access memory (RRAM), parameter random access memory (PRAM), etc.), read only memory (ROM) (e.g., Mask ROM, programmable read only memory (PROM), erasable programmable read only memory (EPROM), electrically erasable programmable read only memory (EEPROM), etc.), flash memory, or any other suitable memory systems. The instructions that are executed by the processor 104 may be used to collect device driver data.

The processor 104 may be connected through a system bus 110 (e.g., PCI, ISA, PCI-Express, NuBus, etc.) to network interface 116 may also be adapted to connect the computing system 100 through the system bus 106 to a network 114.

The storage 108 can include a hard drive, an optical drive, a USB flash drive, an array of drives, or any combinations thereof. A driver data module 116 may be, in some cases, executable instructions to be stored in the storage device 108. In some cases, the driver data module 116 may be implemented as logic, at least partially comprising hardware logic. The driver data module 116 may include submodules including a compression module 118, an encryption module 120, and a transmission module 122. Although FIG. 1 illustrates each of the modules 118, 120, and 122 as being submodules of the driver data module 116, each of the modules 116, 118, 120, and 122 may be implemented as discrete components, or as components of a broader process, or logical hardware construct.

The driver data module 116 may be configured to gather data from drivers of the computing device 102 and generate a data object stored in a memory unit of the computing device 102. In some cases, the driver data module 116 may be configured to provide communication over the network 114 to a central data center 116 which may correspond to the described centralized device driver data collection service, where the compressed and encrypted data object may be decrypted, decompressed, and analyzed. In some embodiments, if the driver data module 116 is configured to have only one-way access to the central data center 124, this may reduce any back-door security threat potential that may otherwise enable malicious or even unintended access to the driver data module 116. Furthermore, in some embodiments, data provided by the driver data module 116 may be throttled. For example, depending on a given application being run on the computing device 102, the driver data module 116 may delay reporting of data over a period of time such that performance of any other operation or application may not be influenced. In other words, the driver data module 116 may be configured to be undetectable in regards to performance degradation that may be caused by an increased load related to driver data collection operations.

The driver data module 116 may be configured to generate a data object stored in a memory unit, such as the memory unit 106, of the computing device 102 based on the collected data.

The data object stored in the memory unit 106 may include a delimited list. The data object may include multiple delimited sections embedded into a single file. The multiple sections of driver data may be extracted out as separate delimited files. The multiple delimited lists may each related to different classes of driver information.

The driver data module 116 may be deployed upon operation of one or more external operations provided via the central data center 124. For example, the central data center 124 may run a structured language query (SQL) to interrogate the computing device 102. Upon deployment of the SQL, the driver data module 116 may be initiated. In some cases, the driver data module 116 may be embedded into an operating system (OS) of the computing device 102. In this scenario, an OS may initiate operations of the driver data module 116. In any case, the driver data module 116 may be configured to deploy after predetermined configurable time periods. For example, in some cases the driver data module 116 may be configured to deploy once per hour.

Once the driver data module 116 has generated the data object related to the driver data, the compression module 118 may be configured to compress the data object. The compressed data object may then be encrypted via the encryption module 120. The encryption module 120 may include a two part process of synchronous encryption such as Advanced Encryption Standard (AES), as well as asynchronous encryption such as RSA. Other encryption methods of both synchronous and asynchronous encryption are contemplated.

The computing system 100 may include other networked devices, such as one or more networked computing devices 126. The networked computing devices 126 may be implemented similar to the computing device 102 and may include a driver data module, such as the driver data module 116 local to each device. Driver data in compressed and encrypted format may be provided to the central data center 124 for analysis by a driver data handler 128. The driver data handler 128 may be implemented as logic, at least partially including hardware logic, software, firmware, or any combination thereof. The driver data handler 128 may be configured to decrypt and decompress the driver data, as well as decompose the combined delimited file into dimensions of data associated with each of the multiple delimited files in the combined delimited file. Data may be stored in a central data store, such as the driver data store 120 of the central data center 124. As discussed in more detail below, the driver data provided to the central data center 124 may be used to update current or previously known driver data based on a change in driver data objects received.

It is to be understood that the block diagram of FIG. 1 is not intended to indicate that a computing system is to include all of the components shown in FIG. 1. Rather, the computing system can include fewer or additional components not illustrated in FIG. 1 (e.g., additional applications, additional modules, additional memory devices, additional network interfaces, etc.). Furthermore, any of the functionalities of the compression module 118, encryption module 120, and transmission module 122 may be partially, or entirely, implemented in hardware and/or in the processor 104. For example, the functionality may be implemented with an application specific integrated circuit, in logic implemented in the processor 104, or in any other device.

Figure 2:
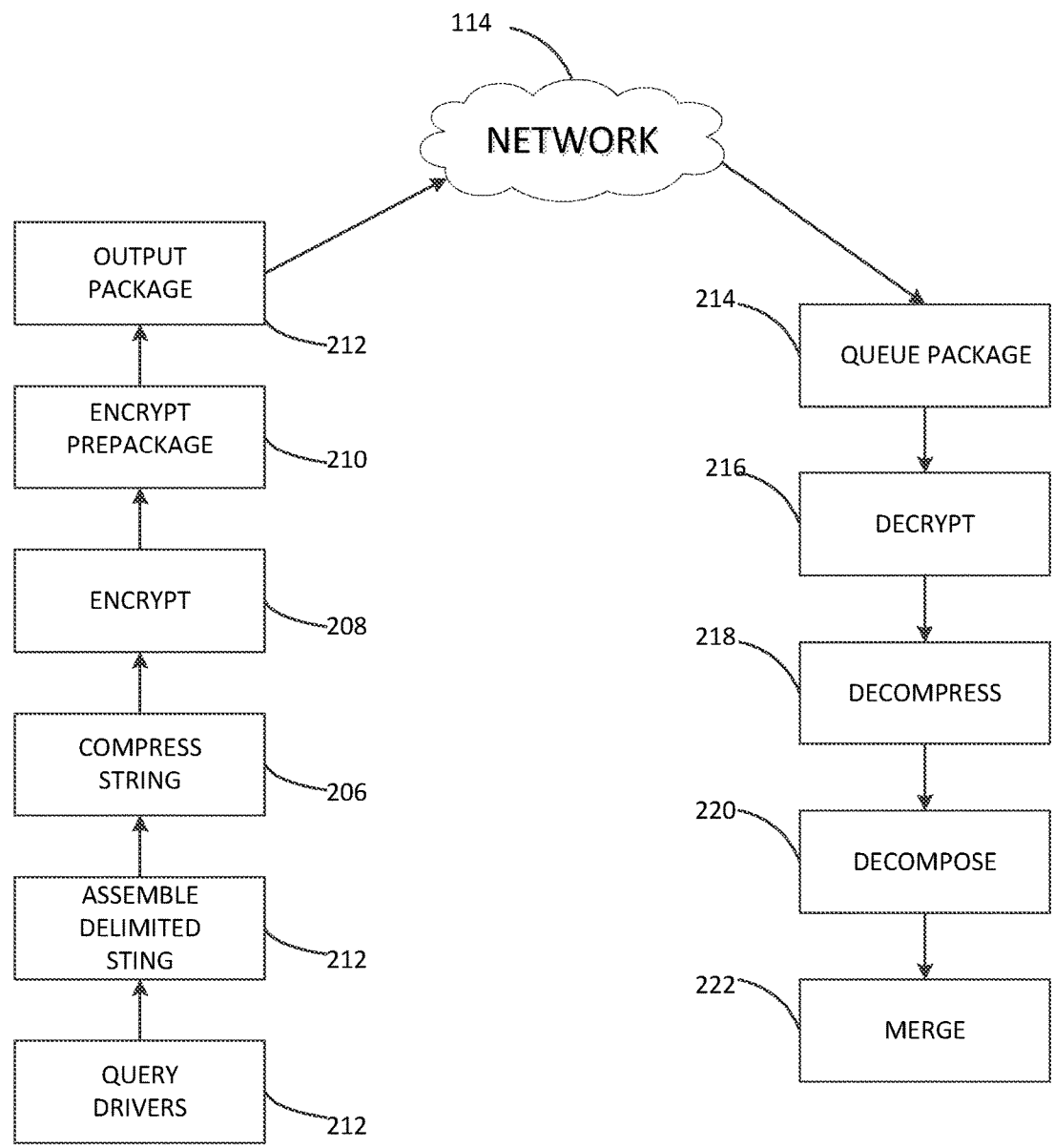
FIG. 2 illustrates an example process for collecting driver data.

FIG. 2 is a process flow diagram of an example process for collecting driver data of a user device. At block 202, driver data may be queried locally at a networked computing device, such as the computing device 102 of FIG. 1.

At block 204, a delimited string may be assembled. Assembly of the delimited string may include generating a data object stored in a memory unit, such as the memory unit 106 of the computing device 102 based on the collected driver data queried at block 202. At block 206 the data object may be compressed, and at block 208 the compressed data object may be encrypted.

Encrypting at block 208 may be a synchronous encryption, such as AES encryption discussed above in regard to FIG. 1. The synchronous encryption 208 may use a dynamically generated key and initialization vector as well as a computed hash value of encrypted bytes. At block 210, asynchronous encryption may be performed on the computed hash value, the dynamically generated key, and initialization vector. The encryption 210 may be packaged as a prepackage using an embedded public key of a destination device, such as a device associated with the central data center 124 of FIG. 1. In some cases, if a temporary directory exists, a plain text, human-readable, file with the driver data may be created at the computing device 102.

The prepackage and a payload including computed hash value of encrypted bytes from the synchronous encryption 208 may be combined into an output file at block 212. The output file may be provided to a network, such as the network 114. In some cases, the network 114 may comprise one or more of the closest networked devices such as the networked computing devices 126. The driver data module 114 of FIG. 1 may comprise a list of addresses for inboxes to potentially use as destination inboxes.

At block 214, the package as well as the prepackage may be queued. The queue at 214 may be configured to pull driver data objects from inboxes and queue them for decomposition. Beforehand, decryption including decryption of the prepackage and decryption of the payload package may be performed at 216. Further, the driver data object may be decompressed at 218. At 220, the assembled delimited string from block 204 may be decomposed. In other words, the combination of delimited files may be separated and decomposed to serialized text to be stored in relational database structure during a merge occurring at 222. Merging may include joining the driver data via SQL to an appropriate database.

In some cases, the decomposition at 220 may include decomposing into in-memory data tables in batches to increase throughput. Once a given number of packages are decomposed into the collection of data tables they may be passed to SQL during the merge 222. Each in-memory data table may be directly passed to SQL without any input/output overhead. For example, a data table dictionary may be assembled. The oldest package may be retrieved from the queue. The package may be exclusively locked, and the first 128 bytes of payload, RSA decrypt may be split off from the computed hash value associated with the synchronous encryption, as well as the key and vector. A second synchronous hash (SHA) may be computed to compare against the decrypted RSA hash. If hashes do not match, the package may be marked as suspect.

The payload may be decrypted using the initialization vector and key. Once the data has been decompressed the delimited and demarked enumeration object data may be parsed. For example, a data table may be targeted wherein a demarked value relates to a key in the dictionary. Decompression may be done in stages based on a batch size. Each data table having a dictionary with more than 0 rows may be sent to SQL, and, once committed to SQL the driver data object may be deleted. Further, the merge 222 may include runtime metrics configured to track performance, scalability, rate of change.

Figure 3:
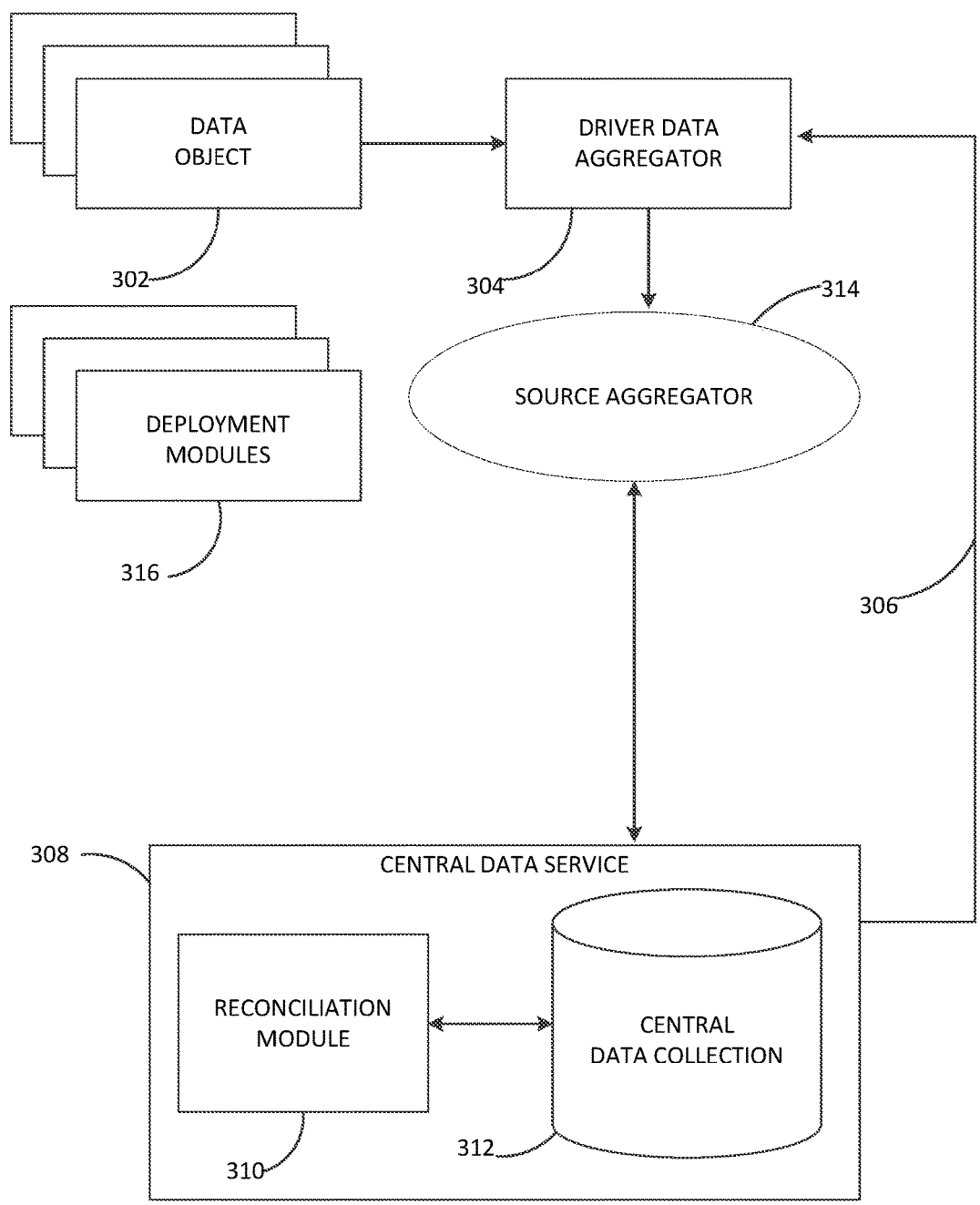
FIG. 3 is a block diagram illustrating a process of reconciling data with a central data service.

FIG. 3 is block diagram illustrating a process of reconciling driver data with a central asset service such as the described centralized device driver data collection service. In some cases, driver data received may be compared with driver data previously stored driver data, and updates may be provided based on any change of driver data. In FIG. 3, data objects may be generated at 302.

The data objects 302 may be driver data objects generated as discussed above in regard to FIG. 1 and FIG. 2 from one or more computing devices, such as the computing device 102, the networked computing devices 126, and the like. The driver data objects at 302 may be passed to a driver data aggregator 304. The driver data aggregator 304 may be a data store, such as the driver data store 130 of FIG. 1, or may be a separate data store configured to temporarily store driver data. As indicated at 306, a central asset service 308 may be pointed to the driver data aggregator 304. The central asset service 308 may be a central inventory system configured to receive driver data and reconcile driver data as the driver data changes via a reconciliation module 310. Differences, or changes in driver data may be provided to a central driver data store 312. The central driver data store 312. Additional tools, such as a source aggregator 314 may be used to receive updates from one or more deployment modules 316. Operations of the source aggregator 314 may provide updates based on reconciliation performed at the reconciliation module 310 and stored in the central driver data store 312 to various one or more deployment modules 316.

Figure 4:
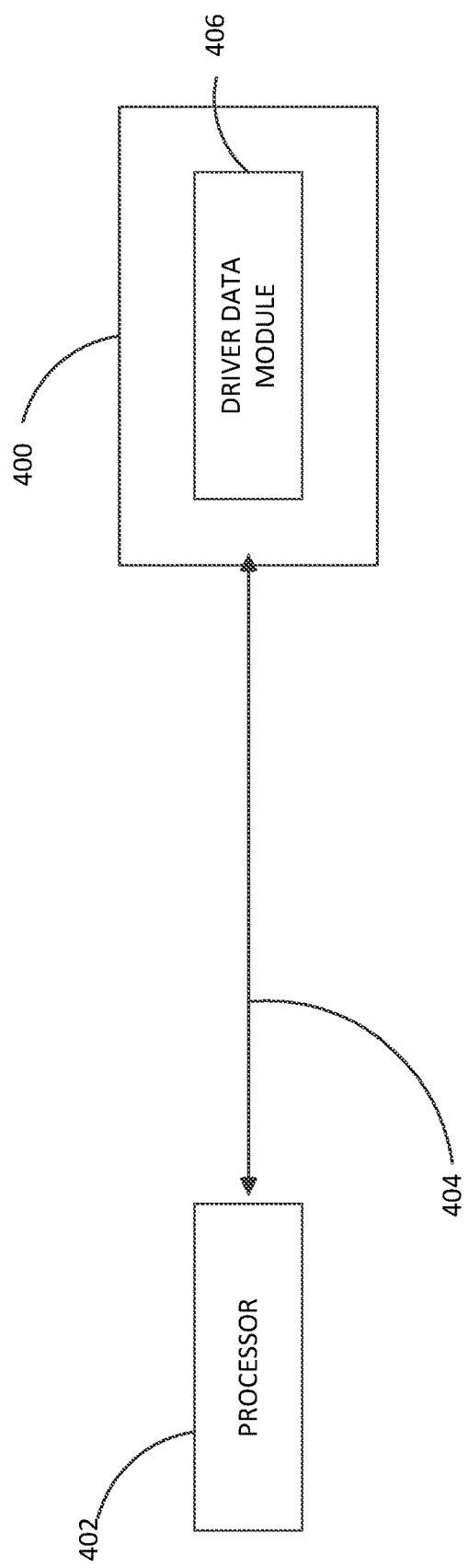
FIG. 4 is a block diagram illustrating a method of generating a data object associated with driver data.

FIG. 4 is a block diagram of an example computer-readable storage media for collecting driver data. The tangible and non-transitory computer-readable storage media 400 may be accessed by a processor 402 over a computer bus 404. Furthermore, the tangible and non-transitory computer-readable storage media 400 may include code to direct the processor 402 to perform the steps of the described methods.

The various software components discussed herein may be stored on the tangible and non-transitory computer-readable storage media 400, as indicated in FIG. 4. For example, the tangible and non-transitory computer-readable storage media 400 can include a driver data collection module 406 for collection of driver data of a user device. The driver data collection module 406 can also generate a data object stored in a memory unit of the networked device based on the collected driver data, wherein the generated object includes a plurality of delimited sections represented in a single file. The driver data collection module 406 can also generate a data object stored in a memory unit of the networked device based on the collected driver data. The data may be compressed and encrypted. The encrypted and compressed data object may be transmitted to a destination device.

The data described herein include examples of information that may be collected from device drivers by the device driver assessment system. Other device health and component level data may be collected. The collection of the data may be scaled to an unlimited number of devices across diverse environments.

Figure 5:
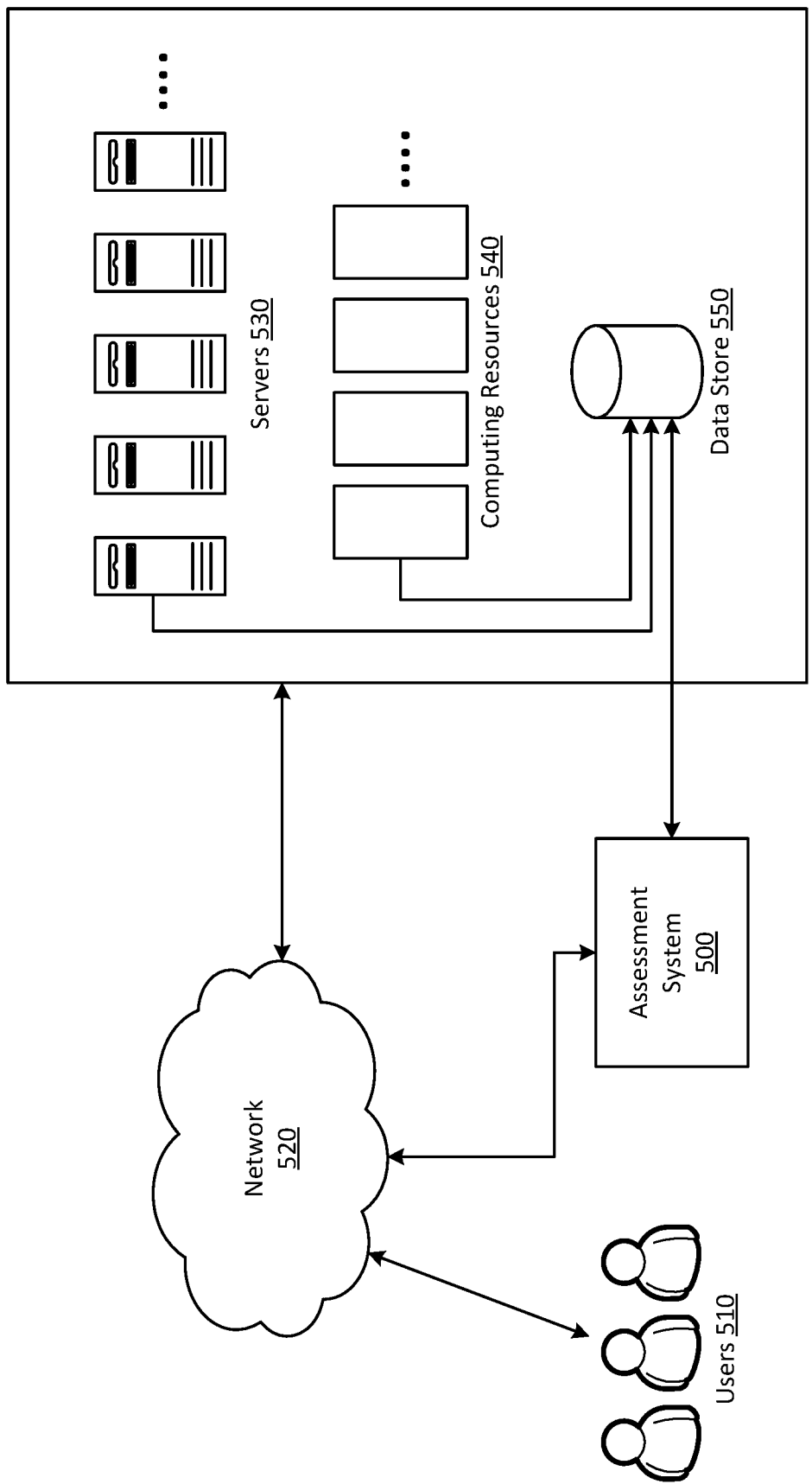
FIG. 5 is a diagram illustrating a mechanism for verification of drivers in accordance with the present disclosure.

FIG. 5 is a diagram illustrating a device driver assessment system 500 for identifying driver issues in accordance with the present disclosure. In FIG. 5, an off-device service may include resources and applications that may execute, for example, on one or more servers 530. It will be appreciated that some embodiments may involve additional computing resources 540 of various types that may be provided.

FIG. 5 also illustrates a network 520 that may provide communications for one or more devices accessible by users 510. According to one embodiment, resources executing on servers 530 may be configured to provide driver support services to users 510 via network 520. FIG. 5 also illustrates a data store 550 that may store data pertaining to various driver data for devices of users 510.

A request may be sent to device driver assessment system 500 for monitoring and analyzing one or more device drivers. The device driver assessment system 500 may be co-hosted with the servers 530 and data store 550, or may reside on devices of users 510, or a combination thereof. In some embodiments, a request may be received from a device of one of the users 510 for analytics services. In other embodiments, the request may be received from one or more services at the device manufacturer. In response to receipt of the request, device driver assessment system 500 may log the request and provide updates as to the status of the request. The device driver assessment system 500 may communicate with other services to facilitate: (1) processing of the request, (2) collection of data pertaining to request, and (3) generating interfaces to provide results of the request. The device driver assessment system 500 may, for example, provide an interface for facilitating submission of the request. The device driver assessment system 500 may further provide an interface for viewing the results of the request and modifying or cancelling the request.

Configuration-based assessment system 500 may be configured to provide analysis and diagnostics for providing analysis based on real time or accumulated and/or archived monitoring of various device drivers. The device driver assessment system 500 may access metrics, such as device type and device usage activity. The device driver assessment system 500 may be made accessible via an application programming interface (API) or a user interface that may be accessed via a Web browser or other input mechanisms.

In some embodiments, device driver assessment system 500 may determine a predicted probability of a failure or other event. Configuration-based assessment system 500 may gather driver data from other components of the operating environment, such as data store 550. Data store 550 may collect information from devices of users 510, among others. The device driver assessment system 500 may also collect information stored in log files and other locations that may be available from computing resources 540. The information may also be obtained by querying devices for data that is not currently being stored in a log file.

It should be appreciated that the network topology illustrated in FIG. 5 has been greatly simplified and that many more networks and networking devices may be utilized to interconnect the various computing systems disclosed herein. These network topologies and devices should be apparent to those skilled in the art.

Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

In some embodiments, the device driver assessment system 500 may monitor driver data automatically. For example, the service provider may monitor a number of pre-selected device drivers at a predetermined frequency. Additional driver data may be collected at the same or different frequencies as specified by the service provider.

Additionally, the device driver assessment system 500 may provide users with notifications or to take specified actions depending on device driver events. For example, the service provider may cause the download of an updated driver to a device that is predicted to fail or otherwise cause issues in the device.

In some embodiments, an API may be provided to facilitate requests for device driver information. For example, an API can be called with information such as a device identifier. After the API is called, in one embodiment the device driver assessment system 500 may take actions such as:

Access activity records for the device.

Retrieve driver data of related devices.

The stored data can be aggregated and analyzed to identify profiles, patterns, and various statistics. For example, through analysis of error rates, health and performance of a device driver can be determined. Data mining of collected device driver data can be useful to identify various characteristics for inferring the current state of a device driver or a group of device drivers.

In some embodiments, the collected data may be analyzed to determine statistical information. Furthermore, data mining may be performed to identify trends and patterns related to device function, health, and performance. In one embodiment, the device driver assessment system may be configured to analyze the data. The device driver assessment system may be implemented, for example, as a rate detection vector engine. The detection vector engine may incorporate a Naive Bayes classifier, fuzzy logic, and other methods. The detection vector engine may be configured to determine which data patterns are relevant for error analysis.

In some embodiments, the device driver assessment system may implement a pattern classification system to identify relevant data. For example, the detection vector engine may include a learning system that may include a learning function to continuously learn which data patterns are relevant to a particular potential problem.

In general, the device driver assessment system may provide information to various users. For example, the device driver assessment system may allow the data to be accessible via a web site, or may allow the data to be accessible to users via a cloud-based system. The device driver assessment system may also allow device support and operations services to access the data via the website or through a side channel. The device support and operations services can therefore access the error levels, warnings, and information status to provide appropriate and timely services to users. For example, design and quality assurance personnel can access the data to make improvements to the design and production processes.

The device driver assessment system may provide useful alerts and information to the user of a device via a user interface of the device. As an example, in one scenario, a healthy device indication may be provided to the user.

In another customer alert scenario, a device health alert may be provided to the user. The alert may notify the user of detected abnormal behaviors that may be impact the user experience.

The device driver assessment system may improve the user experience by providing more accurate diagnostic results and calculation of trackable trends for device drivers that may not be performed on a single device.

Figure 6A:
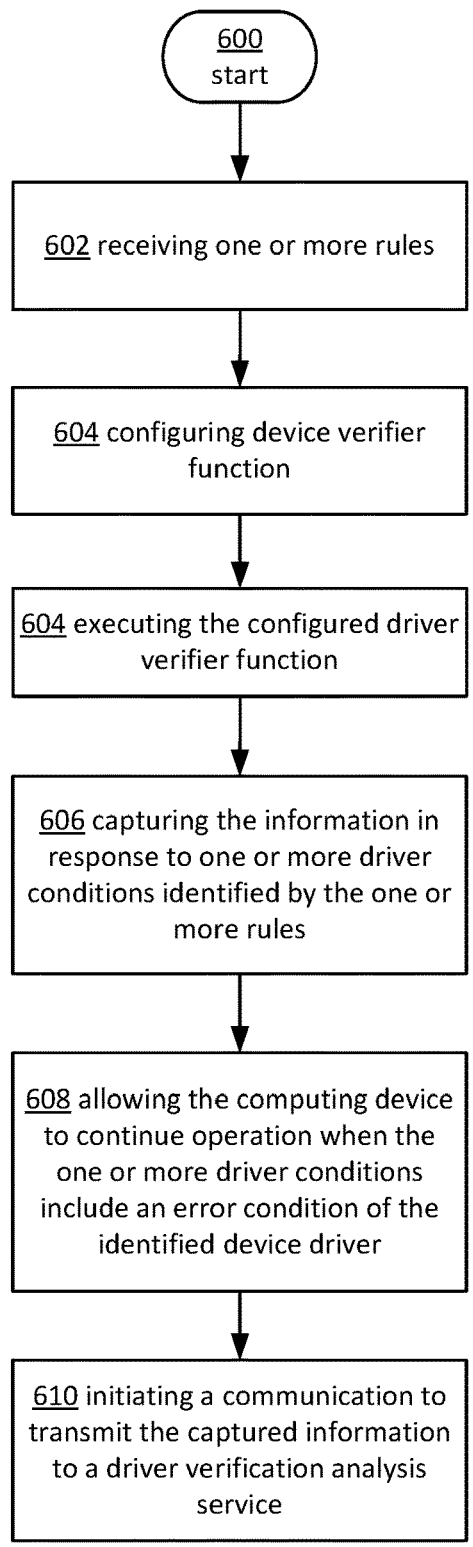
FIGS. 6a and 6b are flowcharts depicting example procedures for verification of drivers in accordance with the present disclosure.

FIG. 6a illustrates an example operational procedure for verifying functionality of a computing device. In an embodiment, the procedure can be implemented at least in part in a system or function on a computing device corresponding to FIG. 1.

Referring to FIG. 6a, operation 600 begins the operational procedure. Operation 600 may be followed by operation 602. Operation 602 illustrates receiving one or more rules usable to configure a driver verifier function to capture information associated with a device driver identified by the one or more rules. Operation 602 may be followed by operation 604. Operation 604 illustrates executing, on a computing device, the configured driver verifier function.

Operation 604 may be followed by operation 606. Operation 606 illustrates capturing, using the configured driver verifier function, the information in response to one or more driver conditions identified by the one or more rules. Operation 606 may be followed by operation 608. Operation 608 illustrates allowing the computing device to continue operation when the one or more driver conditions include an error condition of the identified device driver. Operation 608 may be followed by operation 610. Operation 610 illustrates initiating a communication to transmit the captured information to a driver verification analysis service.

Figure 6B:
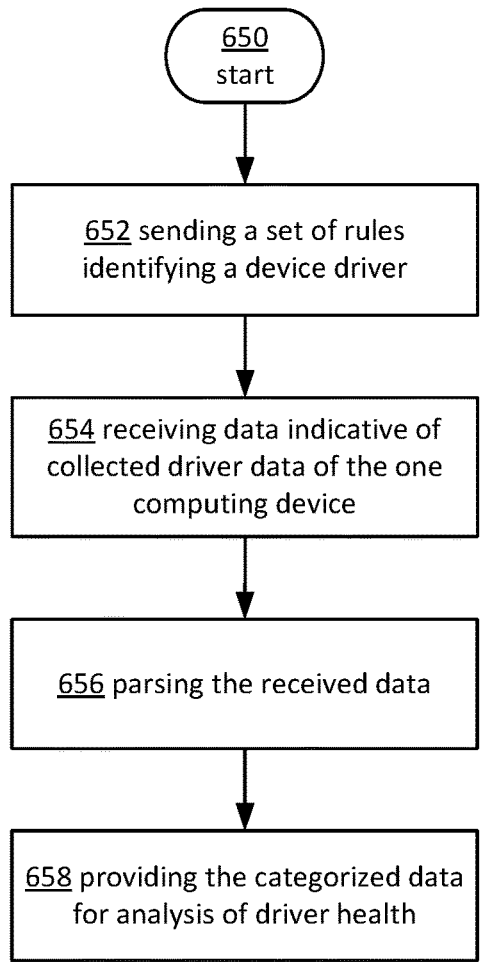

FIG. 6b illustrates an example operational procedure for verifying functionality of a plurality of computing devices. In an embodiment, the procedure can be implemented at least in part in a system or function on a system corresponding to FIGS. 3 and 5.

Referring to FIG. 6b, operation 650 begins the operational procedure. Operation 650 may be followed by operation 652. Operation 652 illustrates sending, to a computing device, a set of rules associated with a device driver installed on the computing device. Operation 652 may be followed by operation 654. Operation 654 illustrates receiving, from the computing device, data indicative of driver data of the computing device. In an embodiment, the driver data may be collected by a driver verifier function executing on the computing device. The driver verifier function may be configured to capture information associated with the device driver in accordance with the set of rules.

Operation 654 may be followed by operation 656. Operation 656 illustrates parsing the driver data to categorize the driver data with previously collected driver data of other computing devices. The driver data may be categorized based at least in part on attributes of the driver data. Operation 656 may be followed by operation 658. Operation 658 illustrates providing the categorized driver data for analysis of the driver health on the computing device.

Figure 7:
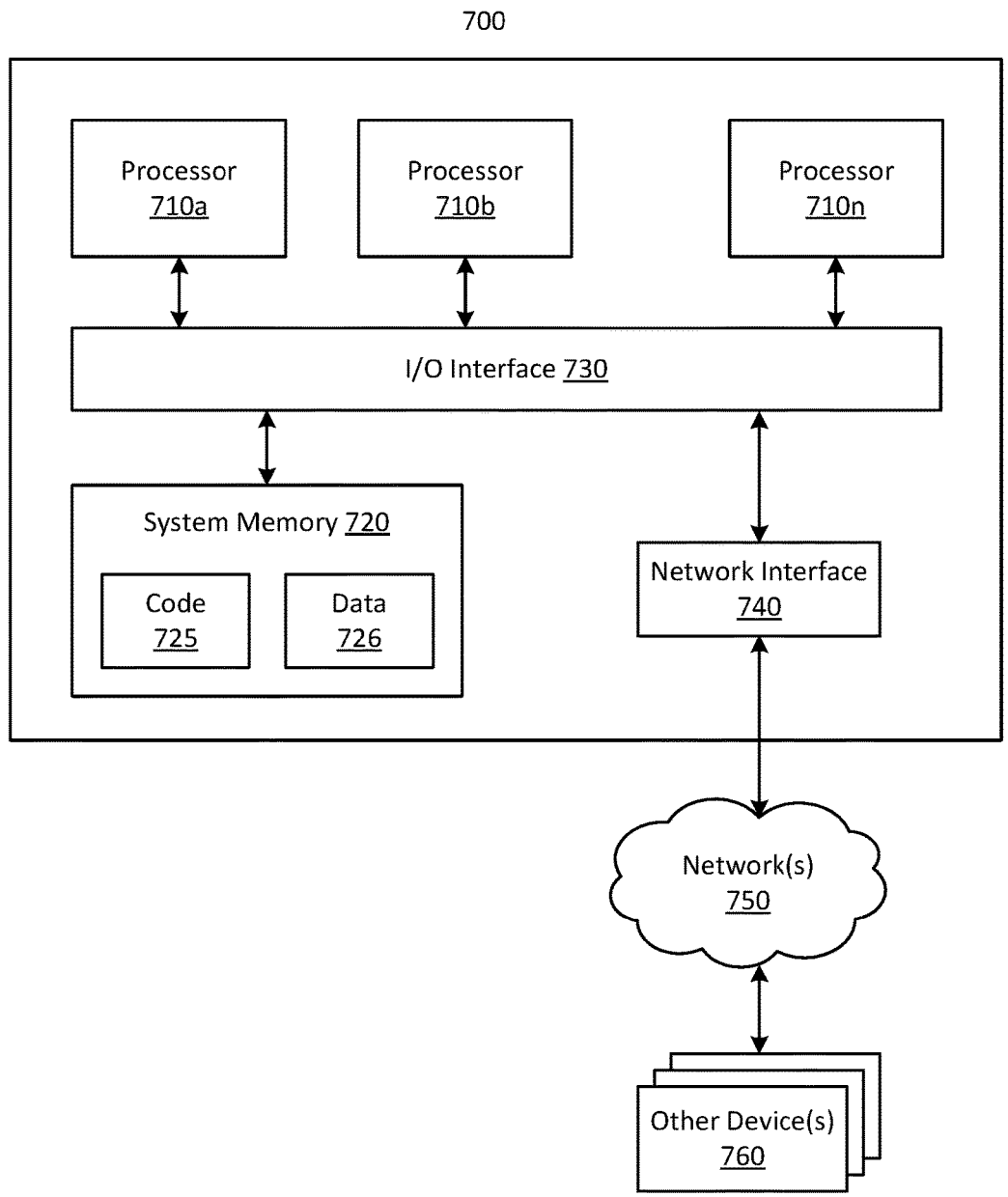
FIG. 7 is an example computer system that may be used in some embodiments.

In at least some embodiments, a computing device that implements a portion or all of one or more of the technologies described herein, including the techniques to implement the functionality of an device driver assessment system 700 may include a general-purpose computer system that includes or is configured to access one or more computer-accessible media. FIG. 7 illustrates such a general-purpose computing device 700. In the illustrated embodiment, computing device 700 includes one or more processors 710a, 710b, and/or 710n (which may be referred herein singularly as "a processor 710" or in the plural as "the processors 710") coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 720 as code 725 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing, or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computing device 700 and other device or devices 760 attached to a network or network(s) 750, such as other computer systems or devices as illustrated in FIGS. 1 through 11, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fibre Channel SANs or via any other suitable type of network and/or protocol.

In some embodiments, system memory 720 may be one embodiment of a computer-accessible medium configured to store program instructions and data as described above for FIGS. 1-6 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 700 as system memory 720 or another type of memory. Further, a computer-accessible medium may include transmission media or signals such as electrical, electromagnetic or digital signals, conveyed via a communication medium such as a network and/or a wireless link, such as may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

For purposes of this specification and the claims, the phrase "computer-readable storage medium" and variations thereof, does not include waves, signals, and/or other transitory and/or intangible communication media.

A network set up by an entity, such as a company or manufacturer, to provide one or more services (such as various types of cloud-based analytics services) accessible via the Internet and/or other networks to a distributed set of clients may be termed a service provider. Such a provider network may include numerous data centers hosting various resource pools, such as collections of physical and/or virtualized computer servers, storage devices, networking equipment, and the like, needed to implement and distribute the infrastructure and services offered by the service provider.

A number of different types of computing devices may be used singly or in combination to implement the resources of the service provider in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

As used herein, the phrase "configured to" may encompass any way that any kind of structural component can be constructed to perform an identified operation. The structural component can be configured to perform an operation using software, hardware, firmware and the like, or any combinations thereof. The term "logic" may encompass any functionality for performing a task. For instance, each operation illustrated in the flowcharts corresponds to logic for performing that operation. An operation can be performed using software, hardware, firmware, physical electronic circuits, and the like, or any combinations thereof. The terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). Computer-readable storage media does not include all implementations of computer-readable media generally, such as signals per se. Therefore, in contrast, computer-readable media generally (i.e., not computer-readable storage media) may additionally include communication media such as transmission media for wireless signals and the like.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for analyzing health of drivers installed on a plurality of computing devices, the method comprising:

sending, by a remote server to a plurality of computing devices operating in a production environment, a set of rules associated with a device driver installed on the computing devices, the set of rules usable to target identified device drivers and user devices;

receiving, by the remote server from the computing devices, data indicative of driver data of the computing devices, wherein the driver data is collected by a driver verifier function executing on the computing devices, the driver verifier function configured to capture information associated with the device driver in accordance with the set of rules;

parsing, by the remote server, the driver data to categorize the driver data with previously collected driver data of other computing devices, the driver data categorized based at least in part on attributes of the driver data indicative of user devices that have encountered specified driver errors;

analyzing, by the remote server, the categorized driver data to generate rankings of the specified driver errors; and rendering a driver health interface indicative of the analyzed driver data.

2. The method according to claim 1, further comprising calculating a predicted probability of a device driver failure based at least in part on the received data.

3. The method according to claim 2, further comprising initiating a maintenance action based on the predicted probability.

4. The method according to claim 1, further comprising constructing the set of rules to configure the driver verifier function.

5. The method according to claim 1, wherein the set of rules define a specified group of the plurality of computing devices.

6. The method according to claim 5, wherein the specified group is defined based on a specified device and driver.

7. The method according to claim 1, wherein the categorized data is searchable using queries for unique event identifiers.

8. The method according to claim 7, wherein the unique event identifiers are indicative of categories for user devices that have encountered specified driver errors, characteristics of the error, drivers that are violating checks, what checks have been violated, and frequency of the violations.

9. The method according to claim 1, wherein the collected driver data is collected on a periodic or scheduled basis.

10. A system configured to facilitate operation of a plurality of computing devices operating in a production environment, the system comprising:

at least one memory having stored therein computer instructions that, upon execution by one or more processors of the system, at least cause the system to:

send, to one of the computing devices, a set of rules associated with a device driver, the set of rules usable to target identified device drivers and user devices;

receive, from the computing device, data indicative of driver data of the computing device, wherein the driver data is collected by a driver verifier function executing on the computing device, the driver verifier function configured to capture information associated with the device driver based on the set of rules;

categorize the received data with previously collected driver data of other computing devices, the data categorized based at least in part on attributes of the driver data indicative of user devices that have encountered specified driver errors;

analyze the categorized data to generate rankings of the specified driver errors; and rendering a driver health interface indicative of the analyzed driver data.

11. The system of claim 10, wherein the received data is categorized based at least in part on common attributes of drivers of the plurality of computing devices.

12. The system of claim 10, wherein the previously collected driver data comprises crowdsourced data.

13. The system of claim 10, further comprising computer instructions that, upon execution by one or more processors of the system, at least cause the system to implement an application programming interface (API) configured to:

receive first electronic messages that encode identifiers indicative of a request for the received data; and in response to receiving one of the first electronic messages, send second electronic messages indicative of information pertaining to the request.

14. The system of claim 10, further comprising computer instructions that, upon execution by one or more processors of the system, at least cause the system to implement a user interface configured to construct the set of rules to configure the driver verifier function.

15. The system of claim 10, wherein the set of rules define a specified group of the plurality of computing devices.

16. The system of claim 10, further comprising computer instructions that, upon execution by one or more processors of the system, at least cause the system to initiate an action associated with an identified condition of a driver of the one computing device.

17. The system of claim 16, further comprising computer instructions that, upon execution by one or more processors of the system, at least cause the system to send a recommended user action based on the identified condition.

18. The system of claim 10, further comprising computer instructions that, upon execution by one or more processors of the system, at least cause the system to indicate a likely cause for an identified condition of a driver.

19. The system of claim 10, further comprising computer instructions that, upon execution by one or more processors of the system, at least cause the system to update the set of rules based on the collected driver data.

20. A server configured to facilitating operation of a plurality of computing devices, the server comprising a processor and memory storing instructions that, when executed by the processor, configure the server to:

receive, from a computing device operating in a production environment, data indicative of driver data associated with a device driver of the computing device, wherein the data is collected by a driver verifier function executing on the computing device, the driver verifier function configured to capture information associated with the device driver based on a set of rules usable to target identified device drivers and user devices;

categorize the driver data with previously collected driver data of other computing devices, the driver data categorized based at least in part on attributes of the driver data, the driver data indicative of user devices that have encountered specified driver errors; and analyze the categorized data to generate rankings of the specified driver errors; and rendering a driver health interface indicative of the analyzed driver data.

* * * * *